R. J. RILEY.
GATE VALVE.
APPLICATION FILED JAN. 18, 1917.

1,226,380.

Patented May 15, 1917.

WITNESSES

INVENTOR
R. J. Riley
BY
ATTORNEYS

UNITED STATES PATENT OFFICE.

RALPH JAMES RILEY, OF LIVERMORE FALLS, MAINE.

GATE-VALVE.

1,226,380.　　　　　Specification of Letters Patent.　　Patented May 15, 1917.

Application filed January 18, 1917. Serial No. 143,052.

*To all whom it may concern:*

Be it known that I, RALPH J. RILEY, a citizen of the United States, and a resident of Livermore Falls, in the county of Androscoggin and State of Maine, have invented a new and Improved Gate-Valve, of which the following is a full, clear, and exact description.

The invention relates to gate valves of low pressure, mainly used for controlling the flow of semi-fluid substances.

An object of the invention is to provide a simple, inexpensive gate valve which is provided with a removable seat for the gate.

Another object of the invention is to provide a valve in which the worn-out seat can be easily and quickly replaced.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views.

Figure 3:
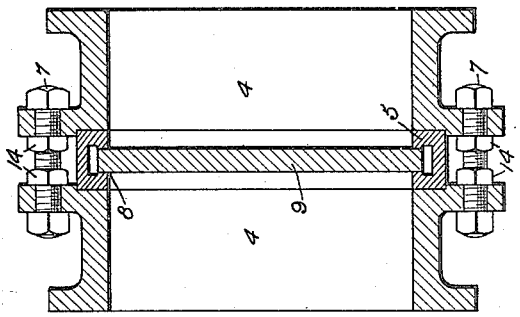
Fig. 3 is a horizontal section on line 3—3, Fig. 1.
Figure 2:
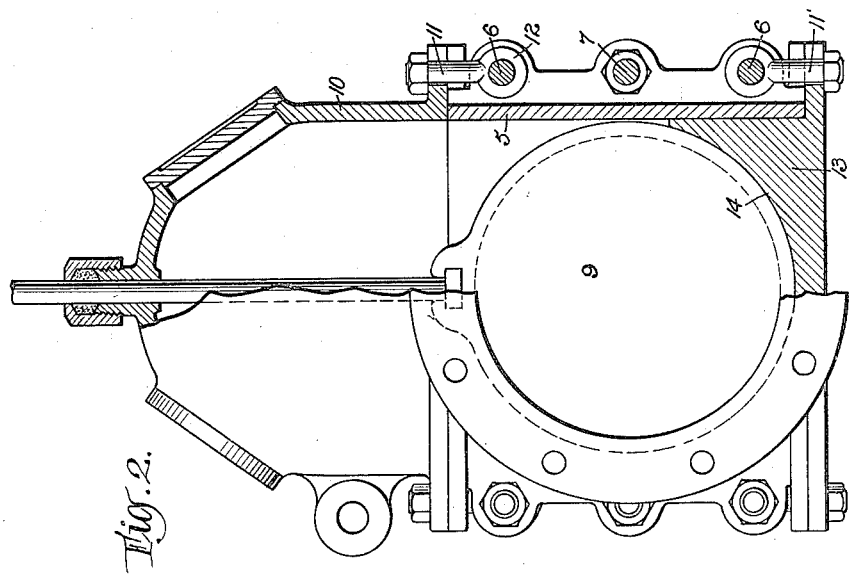
Fig. 2 is a front elevation partly in section illustrating the details of construction.
Figure 1:
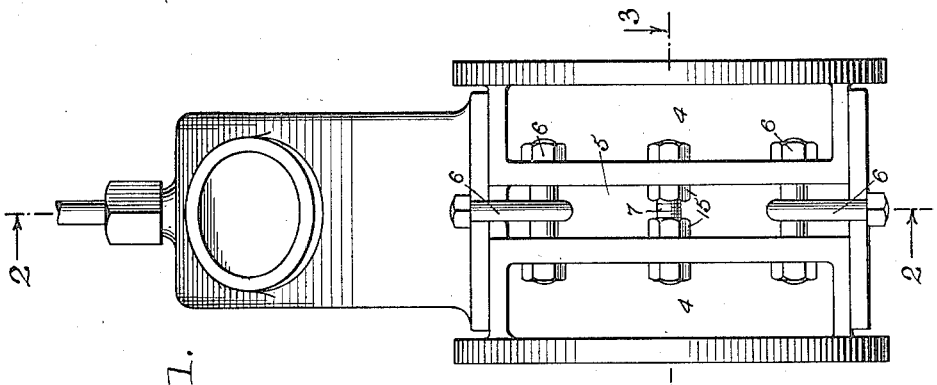
Figure 1 is a side elevation of a gate valve embodying my invention.

Referring to the drawings, 4 4 are the halves of the valve body between which a removable, substantially rectangular gate seat 5 is clamped by bolts 6 and 7. The faces of the halves 4 4 are preferably undercut or recessed, as best shown in Fig. 3, to lock the gate seat 5 from side movement and, therefore, maintain the gate opening in said seat in register with the openings in the halves 4. Said gate seat 5 has a rectangular bore opening at the upper and lower ends. In said bore the seat has a bead 8 about the gate opening therein against which a gate 9 sits when the gate opening in the valve is closed by the gate.

The halves 4 are surmounted by a bonnet 10 which is large enough to accommodate the gate 9 and which is secured to the halves by bolts 11 which have apertured heads 12 fitting on the bolts 6 in close proximity of the bonnet. The bore in the lower end of the gate seat 5 is closed by a plug 13 which fits snugly into the bore and which is retained therein by bolts 118 having apertured heads engaging the bolts 6 provided in close proximity of the lower end of the halves 4. The plug 13 presents a rounded edge to be engaged by the gate 9 when the same is properly seated within the gate seat 5. The plug 13 serves as a stop for the valve and as a bottom clean-out for the valve structure.

The bolts 7 carry nuts 15 located between the halves for separating the halves when a worn-out seat is to be removed. They also serve as means for relieving excessive strain on the flanges of the halves on which the ends of the bolts exert their pressure when the seat is locked between the halves.

To remove a seat, the clean-out 13 is removed, the nuts outside of the flanges are slackened, and then the nuts 15 are made to exert pressure on the flanges, thereby relieving pressure on the seat, which will then drop out from between the halves and a new seat can be introduced. It will be noted that the seat can as well be removed from the top if so desired, but this would not be so convenient. It will be seen that the seat may be replaced without detaching the valve from the line, thereby eliminating the most expensive part of the job, which is the delay in the use of the line and the time involved for the change.

I claim:

1. In a gate valve, a main section formed of halves and each having a fluid passage, a substantially rectangular valve seat between the halves, said valve seat having a rectangular bore open at the top and bottom edges of the seat, said seat having a fluid passage adapted to register with the gate opening of the halves, bolts securing the valve seat to the halves and maintaining the passages of the halves and the seat in register, a bonnet, a bottom clean-out, and bolts for securing the bonnet and bottom clean-out to the halves, said bolts having apertured heads engaging the bolts which secure the halves and seat.

2. In a gate valve, a pair of sections each adapted to be secured to a conduit, a gate seat between the sections, bolts uniting the sections and locking the gate seat to the sections, a clean-out engaging the gate seat at the bottom thereof, means for securing the clean-out to the sections adapted to be anchored to some of the bolts, a bonnet surmounting the sections, and means securing the bonnet to the sections adapted to be anchored to some of the bolts.

3. In a gate valve, a pair of sections each adapted to be secured to a conduit, a gate seat spacing the sections, bolts securing the two sections together and locking the gate seat to the sections, a bonnet surmounting the sections, bolts for securing the bonnet to the sections adapted to be anchored to the bolts securing the sections together adjacent the bonnet, a clean-out associated with the bottom of the gate valve, and bolts for securing the clean-out having means whereby said bolts may be anchored to the bolts for securing the sections together in proximity of the clean-out.

4. In a gate valve, a pair of sections each adapted to be secured to a conduit, a gate seat spacing the two sections, bolts securing the two sections together and locking the gate seat to the sections, some of said bolts having means for spreading said sections whereby the removal of the seat from between the sections is facilitated, a bonnet, bolts for securing the bonnet to the sections, said bolts having apertured heads for receiving the bolts in proximity of the bonnet which connect the sections, a clean-out engaging the bottom of the gate seat, and bolts for securing the clean-out having apertured heads adapted to engage the bolts which connect the sections in proximity of the clean-out.

5. In a gate valve a pair of sections each adapted to be secured to a conduit, a gate seat substantially rectangular in form spacing the two sections, bolts uniting the sections adapted to clamp the gate seat to the sections, said gate seat having a rectangular bore open at the top and bottom edges thereof, a gate adapted to move through the upper end of the bore of said gate seat, a bonnet, bolts for securing the bonnet to the sections, said bolts having apertured heads for engaging the bolts securing the sections in proximity of the bonnet, a clean-out adapted to engage the rectangular bore of the gate seat at the lower end thereof, bolts for securing said clean-out to the sections, said bolts having apertured heads for receiving the bolts which connect the sections in proximity of the clean-out, and means associated with the other bolts which connect the sections for spreading said sections apart to facilitate the removal from or introduction between the sections of the gate seat, substantially as and for the purpose set forth.

RALPH JAMES RILEY.

Copies of this patent may be obtained for five cents each, by addressing the "Commissioner of Patents, Washington, D. C."